W. P. M. BRAUN.
LAWN MOWER STRUCTURE.
APPLICATION FILED MAR. 2, 1918.

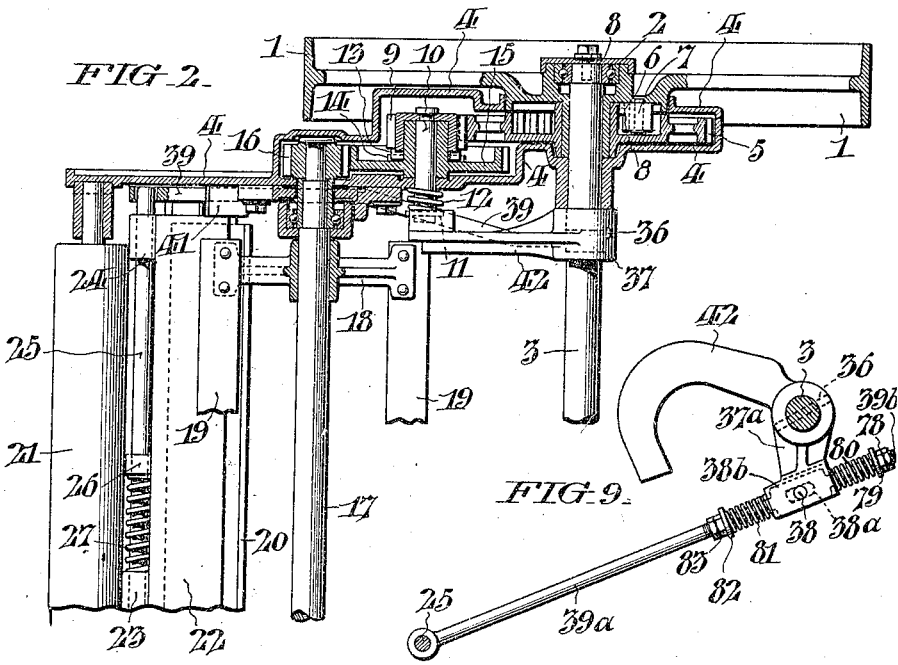

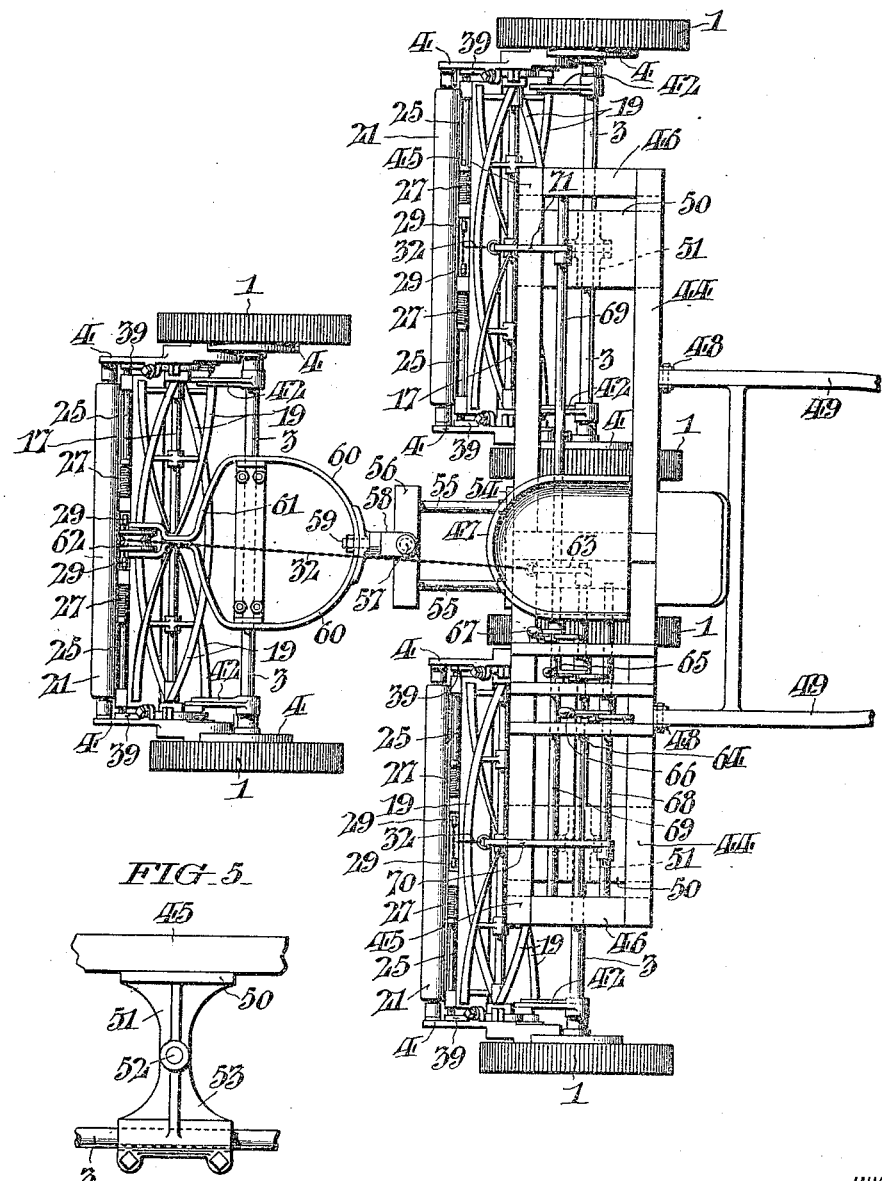

1,295,108.

Patented Feb. 25, 1919.
3 SHEETS—SHEET 3.

INVENTOR
William P. M. Braun
by Cornelius D. Ehret
his ATTORNEY

UNITED STATES PATENT OFFICE.

WILLIAM P. M. BRAUN, OF PHILADELPHIA, PENNSYLVANIA, ASSIGNOR TO PENNSYLVANIA LAWN MOWER WORKS, OF PHILADELPHIA, PENNSYLVANIA, A CORPORATION OF PENNSYLVANIA.

LAWN-MOWER STRUCTURE.

1,295,108.  Specification of Letters Patent.  Patented Feb. 25, 1919.

Application filed March 2, 1918. Serial No. 220,045.

*To all whom it may concern:*

Be it known that I, WILLIAM P. M. BRAUN, a citizen of the United States, residing in the city of Philadelphia, county of Philadelphia, and State of Pennsylvania, have invented certain new and useful Improvements in Lawn-Mower Structures, of which the following is a specification.

My invention relates to lawn mowers of the type comprising a ground engaging wheel driving rotary cutter mechanism by any suitable means, as gearing.

It is the object of my invention to provide means for preventing the cutter mechanism from rising or jumping from the ground or for holding the cutter mechanism in predetermined relation with respect to the ground, and to these ends I provide structure for preventing the pivoted frame or support of the cutter mechanism from partaking of rotary or pivotal movement away from the ground by locking or holding the same in predetermined relation with respect to a relatively fixed element, as for example, an axle which is held against rotation.

It is a further object of my invention to provide means for releasing the cutter mechanism from restraint of the character above referred to and for lifting the same from the ground.

To these and other ends I provide structure of the character hereinafter described and claimed.

For an illustration of some of the various forms my invention may take, reference is to be had to the accompanying drawings, in which:

Figure 1 is a side elevational view, partly in section, of lawn mower structure embodying my invention.

Fig. 2 is a sectional view, some parts in plan, taken on the line 2—2 of Fig. 1.

Fig. 3 is a fragmentary sectional view taken on the line 3—3 of Fig. 1.

Fig. 4 is a plan view of a gang mower embodying my invention.

Fig. 5 is a fragmentary elevational view showing means for connecting a mower unit axle to the gang mower frame.

Fig. 9 illustrates a modified locking structure.

Figure 6:
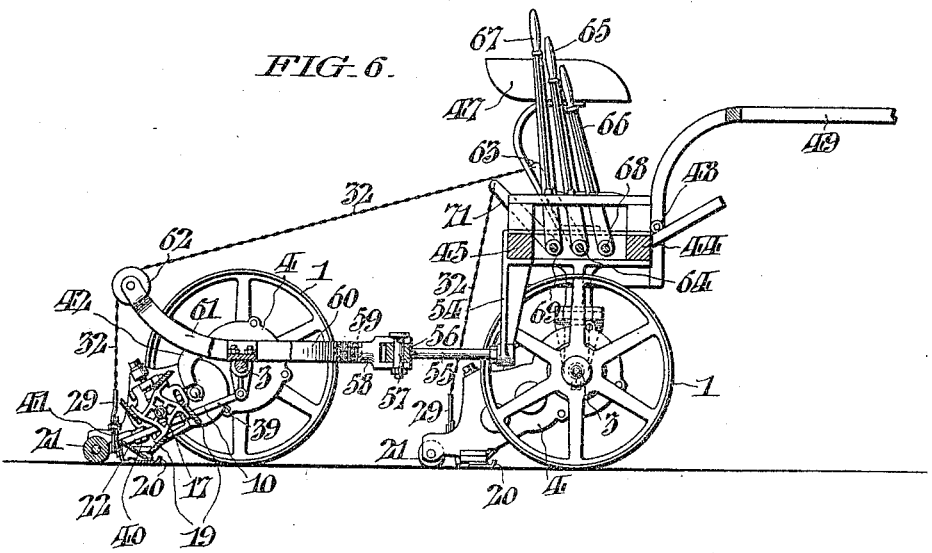
Fig. 6 is a side elevational view of the gang mower shown in Fig. 4.

Referring to Figs. 1, 2 and 3, 1 represents a ground engaging wheel rotatable on ball bearing 2 upon the shaft or axle 3, which is fixed or held against rotation. A side frame or gear case 4 is capable of pivotal or rotary movement upon the axle 3. Within the gear casing 4 is the gear 5 driven by dog 6 pivoted at 7 upon the wheel 1 and engaging teeth or lugs 8 upon the hub of the gear 5, in well known manner. The gear 5 meshes with and drives the pinion 9, which is movable laterally by the pin 10, which extends to the exterior of the casing 4 and is provided with a collar 11 between which and the gear casing 4 is the spring 12, which exerts a pressure toward the left, Fig. 3, to hold the pinion 9 in the position illustrated in Figs. 2 and 3. In this position the lugs 13 on the pinion 9 engage with lugs 14 on the gear 15 which meshes with and drives the pinion 16 secured upon the shaft 17, which rotates the spiders 18 carrying the rotary cutter blades 19 coöperating with the dead knife 20 to sever grass in well known manner. The dead knife 20 is supported by the member 22 attached to the frames or gear cases 4 at opposite sides of the mower unit. Behind the dead knife 20 and rolling upon the ground is the usual idler roller 21.

Figure 7:
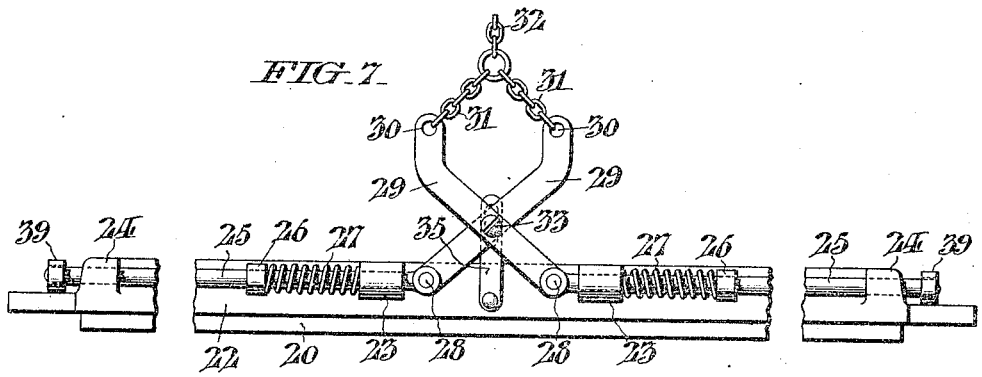
Fig. 7 is an elevational view of part of my novel structure.

As seen in Fig. 7, the transversely extending member 22, attached at its opposite ends to the side frames or casings 4, is provided with two pairs of lugs 23, 24, in which are longitudinally movable the bolts 25. On each bolt 25, between the lugs 23 and 24, is secured a collar 26, between which and the lug 23 is disposed a spring 27 surrounding the bolt 25 and thrusting the same outwardly toward the side frames 4. To the inner end of each bolt 25 there is pivoted at 28 a link 29 connected at its opposite end 30 by chain 31 to the chain or cord 32. The links 29 cross each other and are pivoted upon the common pivot 33 movable in the vertical slot 34 in the vertically extending member 35 secured to the aforementioned cross piece 22.

Secured to the shaft or axle 3, as by pin 36, is the lug or member 37, to which is pivotally connected at 38 the lever or bar 39 extending outwardly and backwardly along the side frame 4 and disposed loosely between the lugs 40 and 41 on the side frame 4. At its rear end the member 39 has a hole into which is movable the bolt 25. The hole in the member 39 receiving the bolt 25 may be somewhat larger than the bolt 25 to allow freedom of movement hereinafter referred to.

Secured to the axle 3 is the rearwardly extending member 42 which may be integral with the aforementioned member 37 as in the example illustrated. At its rear lower end the member 42 is beveled, as more clearly shown at 43, Fig. 3, and is disposed in the path of travel of the outer end of the pin 10.

Referring now more particularly to Figs. 4 to 6 inclusive, a gang mower is shown comprising three mower units each equipped with the structure hereinbefore described. The gang mower comprises a frame comprising the transversely extending beams 44, 45, suitably held together by cross pieces 46. The frame carries the driver's seat 47, and to the frame at 48, 48 may be connected the shafts 49, to which a horse may be hitched.

Near each end of the frame is secured a cross piece 50, to which is secured the downwardly extending bracket 51, to which there is pivoted at 52 the bracket 53, secured to the axle 3 of a mower unit, the axle 3 being held against rotation by its connection to the frame, the pivot 52 nevertheless allowing the axle, and therefore the mower unit as a whole, to oscillate laterally in a vertical plane, so that the mower unit may accommodate itself to undulations of the ground surface.

Trailing behind the two mower units beneath the frame is a third mower unit of like structure, the rotary cutter blades 19 of the rear mower unit suitably overlapping the gap between the cutter blades 19 of the front mower units, so that the rear mower unit will cut the grass left between the swaths cut by the front mower units.

Secured to the frame are the downwardly extending members 54, to whose lower ends are attached the rearwardly extending horizontal members 55, to which is secured the member 56 through a vertical hole in which extends the vertical pivot pin 57 allowing the rear mower unit to take an angle with respect to the frame when the gang mower takes a curvilinear path. The pivot pin 57 is carried by the member 58 carrying the horizontal pivot pin 59, on which may laterally oscillate in a vertical plane the yoke 60 secured to the axle 3 of the rear mower unit, which may thus oscillate upon the horizontal pivot 59 to accommodate itself to undulations in the ground surface. By its connections to the frame the axle 3 of the rear mower unit is also held against rotation. Secured to the yoke 60 is the bracket 61 carrying the idler pulley 62, over which extends the chain or cord 32 connected to the end of the lever 63 secured upon a horizontal shaft 64 journaled in the frame and actuated by the hand lever 65 disposed near the driver's seat 47.

Disposed near the driver's seat 47 are also the two hand levers 66 and 67 for actuating the rotatable shafts 68 and 69, journaled in the frame, and actuating in turn levers 70 and 71, to which the chains or cords 32 of the front mower units are connected.

The operation is as follows:

As the structure moves forwardly over the ground, each mower unit cuts a swath due to the rotation of its cutter mechanism by its ground engaging wheel or wheels.

The cutter mechanism is prevented from jumping or rising from the ground by the engagement of the bolt 25 in the lever or bar 39, the latter being secured to the axle 3, which is held against rotation. The engagement of the bolt 25 in the bar 39 in effect locks the side frame 4, carrying the cutter mechanism, against any pivotal or rotative movement upon the axle 3. However, slight rising or jumping may be permitted by making the hole in the member 39 suitably larger than the bolt 25, so that the cutter mechanism is not rigidly locked to the axle 3.

If the chain or cord 32 is pulled upwardly where it is attached to the links 29, the upward pull on the chain 32, due to the weight of the side frames and everything carried thereby, will cause the links 29 to move upon their pivot 33, which simultaneously moves in the vertical slot 34, to compress the springs 27 and draw the bolts 25 inwardly to disengage them from the bars or members 39, whereupon the side frames 4 and everything carried thereby are free to rotate upon the axle 3 upon further lifting upon the chain 32. When the side frames 4 have been so released from the bolts 25 and they are raised, each pin 10 engages the beveled surface 43 of the member 42, which latter is secured to the axle 3, forcing the pin 10 inwardly in opposition to the spring 12 and disengaging the lugs 13 and 14 from each other by lateral movement of the pinion 9, thereby interrupting the train of gearing and disconnecting the cutter mechanism from the ground engaging wheel 1, which latter may continue to roll upon the ground without rotating the now raised cutter mechanism, this structure constituting in effect a clutch for disengaging the cutter mechanism from the ground engaging wheel, both the ground engaging wheel and the side frame or casing 4 being free to rotate upon the fixed axle 3.

This unlocking of the bolt 25 from the member 39 when the structure is used in a gang mower, as described, may be accomplished by actuating the proper one of the levers 65, 66 or 67, each of these levers accomplishing the unlocking and raising of the cutter mechanism in one of the mower units.

While in the gang mower hereinbefore described the frame is carried by two of the mower units by attachment to their axles 3 through pivots 52, it will be understood that the mower units may be simply moved over the ground by the frame and the frame itself carried on independent ground engaging wheels.

Figure 8:
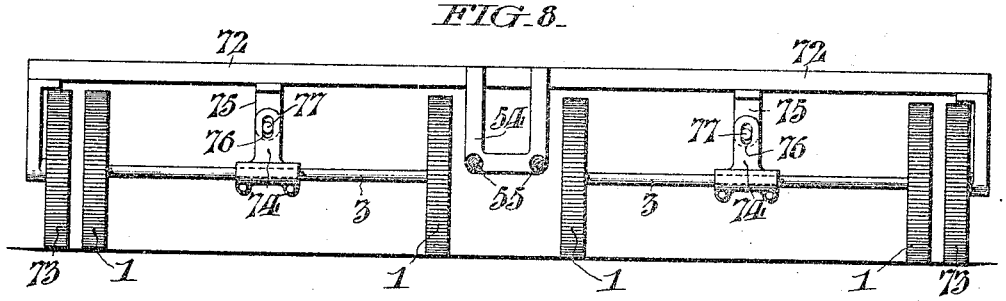
Fig. 8 is an elevational view of part of a gang mower wherein the frame is carried by ground engaging wheels other than those of the mower units.

Such structure is indicated in Fig. 8, where the frame 72 is carried by the ground engaging wheels 73 while the axle 3 of each of the mower units has secured to it a bracket 74 coöperating with a bracket 75 secured to the frame 72. One of the bracket members, as 74, may have therein the vertical slot 76, in which is disposed the pin 77 carried by the other bracket member, as 75. This structure holds the axle 3 against rotation because of its connection to the frame 72, and the pin and slot connection allows each mower unit to oscillate laterally in a vertical plane to accommodate itself to undulations in the ground surface, the slot allowing independent vertical movement of the mower unit, which has the structure hereinbefore described preventing the rise or jumping of the cutter mechanism, etc.

In Fig. 9 is shown a modified construction of the means for locking or restraining the cutter mechanism with respect to the axle 3. In this case the member 37$^a$, secured as by pin 36 to axle 3, carries the pivot pin 38 extending through the slot 38$^a$ in the enlargement 38$^b$ attached to the bar or lever 39$^a$ in a hole in whose end engages the bolt 25 of the character and actuated as hereinbefore described. Integral with the enlargement 38$^b$ is the extension stem 39$^b$ on which are threaded the nuts 78 forming an abutment for the collar 79 between which and the member 37$^a$ is disposed the spring 80 surrounding the stem 39$^b$, the spring tending to force the rod 39$^a$ toward the right. Engaging the other side of the member 37$^a$ is a similarly disposed spring 81 thrusting against the collar 82, held by nuts 83 threaded upon bar 39$^a$.

The springs 80 and 81 hold the member 39$^a$ in mid-position with the pin 38 at substantially the middle of the slot 38$^a$.

It will be understood, therefore, that this structure of Fig. 9 allows limited movement of the cutter mechanism, and within the limits of the movement the springs oppose the movement in the one direction or the other. The extent of the movement allowed is determined by the length of the slot 38$^a$ if, as indicated, there is no lost motion between the bolt 25 and the lever 39$^a$.

As in the case of the structure hereinbefore described, that of Fig. 9 is entirely released from restraint or locking relation upon withdrawal of the bolt 25 from member 39$^a$, whereupon the side frame and cutter mechanism may be raised from the ground by pivotal movement upon the axle 3.

In structure of the character herein described, the restraint upon the cutter mechanism support, as side frame 4, preventing its rise or jumping is independent of force exerted by hand, motor or horse in moving the apparatus over the ground.

What I claim is:

1. Lawn mower structure comprising a ground engaging wheel, rotary cutter mechanism driven thereby, a support for said rotary cutter mechanism, a fixed member on which said support is pivoted to allow movement of said support and said cutter mechanism to different positions above the ground, and means for detachably securing said support to said member for holding said support against pivotal movement with respect to said fixed member and said cutter mechanism in substantially fixed position above the ground.

2. Lawn mower structure comprising a ground engaging wheel, rotary cutter mechanism driven thereby, a support for said rotary cutter mechanism, a fixed member on which said support is pivoted, and a lost motion connection between said support and said fixed member allowing movement of said cutter mechanism within predetermined limits above the ground.

3. The combination with lawn mower structure, of a frame member for moving the same over the ground, said lawn mower structure comprising a rotary ground engaging wheel, cutter mechanism driven thereby, a support for said cutter mechanism, a member attached to said frame member and held against rotative movement, a pivotal connection between said cutter mechanism support and said second named member, and means for detachably securing said support against pivotal movement with respect to said second named member.

4. Lawn mower structure comprising an axle held against rotation, a ground engaging wheel rotatable on said axle, rotary cutter mechanism driven by said wheel, a support for said cutter mechanism pivoted on said axle, and means for detachably securing said support to said axle to prevent pivotal movement of said cutter mechanism with respect thereto.

5. Lawn mower structure comprising rotary cutter mechanism, a support therefor, a fixed member on which said support is pivoted to allow rising movement of said cutter mechanism with respect to the ground, a second member connected to said first named member and having an aperture, and a bolt carried by and movable with respect to said support for engaging in said aperture for preventing pivotal movement of said support upon said first named member.

6. Lawn mower structure comprising a ground engaging wheel, rotary cutter mechanism driven thereby, a support for said cutter mechanism, a fixed axle for said wheel upon which said support is pivoted, a member connected to said axle and having an aperture, and a bolt carried by said support and adapted to engage in said aperture for holding said support against rotation upon said axle.

7. Lawn mower structure comprising an axle held against rotation, a ground engaging wheel rotatable on said axle, rotary cutter mechanism driven by said wheel, a support for said cutter mechanism pivoted on said axle, a member connected to said axle and having an aperture, and a bolt carried by said support and adapted to engage in said aperture for holding said support against rotation upon said axle.

8. Lawn mower structure comprising a ground engaging wheel, an axle therefor held against rotation, rotary cutter mechanism driven by said wheel, a support for said cutter mechanism pivoted on said axle, a member secured to said axle, a bar having an aperture in one end and pivoted at its other to said member, and a bolt carried by said support and adapted to engage in said aperture for locking said support against movement upon said axle.

9. Lawn mower structure comprising a ground engaging wheel, an axle upon which said wheel is rotatable, rotary cutter mechanism, a side frame in which said cutter mechanism is journaled, said side frame having pivotal movement upon said axle, gearing carried by said side frame through which said wheel drives said cutter mechanism, a bar connected to said axle and extending along said side frame and having an aperture, and a bolt carried by said side frame and adapted to engage in said aperture to lock said side frame against pivotal movement upon said axle.

10. Lawn mower structure comprising a ground engaging wheel, rotary cutter mechanism driven thereby, a support for said cutter mechanism, a member on which said support is pivoted, means for locking said support to said first named member, and means for actuating said locking means from locking position and for moving said support upon said first named member.

11. Lawn mower structure comprising a ground engaging wheel, rotary cutter mechanism driven thereby, a support for said cutter mechanism, a member on which said support is pivoted, means for locking said support to said first named member comprising a locking member, and means for withdrawing said locking member from locking position and for raising said cutter mechanism from the ground.

12. Lawn mower structure comprising a ground engaging wheel, rotary cutter mechanism driven thereby, a support for said cutter mechanism, a member on which said support is pivoted, means for locking said support to said member comprising a locking member, a spring holding said locking member in locking position, and means for moving said locking member in opposition to said spring and for lifting said cutter mechanism from the ground.

13. Lawn mower structure comprising a ground engaging wheel, rotary cutter mechanism driven thereby, a support for said cutter mechanism, a member on which said support is pivoted, means for locking said support to said member comprising a locking member, a lever pivoted to said locking member for moving the same, and means connected to said lever for actuating the same to withdraw said locking member from locking position and for raising said cutter mechanism from the ground.

14. Lawn mower structure comprising a ground engaging wheel, an axle held against rotation on which said wheel rotates, rotary cutter mechanism, a support therefor pivoted on said axle, a clutch forming a connection between said driving wheel and said cutter mechanism, a member in fixed relation with respect to said axle shifting said clutch to disengage said cutter mechanism from said wheel upon movement of said support upon said axle, and means for locking said support against pivotal movement on said axle.

15. A gang lawn mower comprising a plurality of mower units, a frame, each mower unit comprising a ground engaging wheel, rotary cutter mechanism driven thereby, a support for said cutter mechanism, a member on which said support is pivoted, means for locking said support to said first named member, and means on said frame for actuating said locking means.

16. A gang lawn mower comprising a plurality of mower units, a frame, each mower unit comprising a ground engaging wheel, rotary cutter mechanism driven thereby, a support for said cutter mechanism, a member on which said support is pivoted, means for locking said support to said first named member, and means on said frame for actuating said locking means and for raising said cutter mechanism from the ground.

17. A gang lawn mower comprising a plurality of mower units, a frame, a mower unit comprising an axle held against rotation by said frame, a ground engaging wheel rotatable on said axle, rotary cutter mechanism driven by said wheel, a support for said cutter mechanism pivoted on said axle, means for locking said support against pivotal movement on said axle whereby said cutter mechanism is held in predetermined relation with respect to the ground, said locking means comprising a bolt engaging a member connected to said axle, a lever for moving said bolt, and means on said frame for actuating said lever.

18. A gang lawn mower comprising a plurality of mower units, a frame, a mower unit comprising an axle held against rotation by said frame, a ground engaging wheel rotatable on said axle, rotary cutter mechanism driven by said wheel, a support for said cutter mechanism pivoted on said axle, means for locking said support against pivotal movement on said axle whereby said cutter mechanism is held in predetermined relation with respect to the ground, and means on said frame for actuating said locking means to free said support.

19. A gang lawn mower comprising a plurality of mower units, a frame, a mower unit comprising an axle held against rotation by said frame, a ground engaging wheel rotatable on said axle, rotary cutter mechanism driven by said wheel, a support for said cutter mechanism pivoted on said axle, means for locking said support against pivotal movement on said axle whereby said cutter mechanism is held in predetermined relation with respect to the ground, and means on said frame for actuating said locking means to free said support and for raising said cutter mechanism from the ground.

20. A gang lawn mower comprising a plurality of mower units, a frame, one or more of said mower units comprising an axle held against rotation by said frame and pivoted thereto for lateral oscillation in a vertical plane, a ground engaging wheel, rotary cutter mechanism driven thereby, a support for said cutter mechanism pivoted upon said axle, means for locking said support with respect to said axle whereby said cutter mechanism is held in predetermined relation with respect to the ground, said locking means comprising a bolt engaging a member connected to said axle, a spring urging said bolt toward locking position, a lever for moving said bolt in opposition to said spring, and means on said frame for actuating said lever and for lifting said cutter mechanism from the ground.

21. Lawn mower structure comprising ground engaging wheels, cutter mechanism driven thereby, a support for said cutter mechanism comprising side frames, means on which said side frames are pivoted, a transversely extending member connecting said side frames, members connected to said means, bolts carried by and slidable with respect to said transversely extending member to engage said last named members, levers for actuating said bolts, and means for lifting said cutter mechanism connected to said levers.

In testimony whereof I have hereunto affixed my signature this 21st day of February, 1918.

WILLIAM P. M. BRAUN.

Copies of this patent may be obtained for five cents each, by addressing the "Commissioner of Patents, Washington, D. C."